(12) United States Patent
Liu et al.

(10) Patent No.: US 9,409,120 B2
(45) Date of Patent: Aug. 9, 2016

(54) HYBRID PROCESS USING A MEMBRANE TO ENRICH FLUE GAS $CO_2$ WITH A SOLVENT-BASED POST-COMBUSTION $CO_2$ CAPTURE SYSTEM

(71) Applicant: University of Kentucky Research Foundation, Lexington, KY (US)

(72) Inventors: Kunlei Liu, Lexington, KY (US); Reynolds A. Frimpong, Lexington, KY (US); Kun Liu, Lexington, KY (US)

(73) Assignee: THE UNIVERSITY OF KENTUCKY RESEARCH FOUNDATION, Lexington, KY (US)

( * ) Notice: Subject to any disclaimer, the term of this patent is extended or adjusted under 35 U.S.C. 154(b) by 0 days.

(21) Appl. No.: 14/591,392

(22) Filed: Jan. 7, 2015

(65) Prior Publication Data
US 2015/0190748 A1  Jul. 9, 2015

Related U.S. Application Data

(60) Provisional application No. 61/924,373, filed on Jan. 7, 2014.

(51) Int. Cl.
*B01D 53/22* (2006.01)
*B01D 53/14* (2006.01)
*F01K 23/06* (2006.01)

(52) U.S. Cl.
CPC .......... *B01D 53/229* (2013.01); *B01D 53/1425* (2013.01); *B01D 53/1443* (2013.01);
(Continued)

(58) Field of Classification Search
CPC .......... B01D 53/1425; B01D 53/1443; B01D 53/1475; B01D 53/229; B01D 2053/221; Y02C 10/10; F01K 23/067
USPC ............................................ 95/51
See application file for complete search history.

(56) References Cited

U.S. PATENT DOCUMENTS 4,772,295 A * 9/1988 Kato ................... B01D 53/1443
95/50
5,520,894 A 5/1996 Heesink et al.
(Continued)

*Primary Examiner* — Jason M Greene
(74) *Attorney, Agent, or Firm* — King & Schickli, PLLC

(57) ABSTRACT

A process for recovery of $CO_2$ from a post-combustion gas includes pre-concentrating a $CO_2$ component of the post-combustion flue gas by passing the post-combustion gas through a $CO_2$-selective membrane module to provide a $CO_2$-enriched permeate stream and a $CO_2$-lean reject stream. Next, in a $CO_2$ absorber, both the $CO_2$-enriched permeate stream and $CO_2$ lean reject stream, fed to separate feed locations on the $CO_2$ absorber, are contacted with a scrubbing solvent to absorb $CO_2$ and provide a carbon-rich scrubbing solvent. Finally, absorbed $CO_2$ is stripped from the carbon-rich scrubbing solvent by a two-stage $CO_2$ stripping system. The $CO_2$-selective membrane may be a high flux, low pressure drop, low $CO_2$ selectivity membrane. The two stage stripping system includes a primary $CO_2$ stripping column for stripping $CO_2$ from the carbon-rich scrubbing solvent exiting the $CO_2$ absorber, and a secondary $CO_2$ stripping column for stripping $CO_2$ from a carbon-lean scrubbing solvent exiting the primary $CO_2$ stripping column. Apparatus for $CO_2$ removal from post-combustion gases in a pulverized coal power plant incorporating the described processes are described.

21 Claims, 5 Drawing Sheets

(52) U.S. Cl.
CPC .......... *B01D53/1475* (2013.01); *F01K 23/067* (2013.01); *B01D 2053/221* (2013.01); *Y02C 10/06* (2013.01); *Y02C 10/10* (2013.01); *Y02E 20/18* (2013.01)

(56) References Cited

U.S. PATENT DOCUMENTS

| | | | |
|---|---|---|---|
| 6,011,192 A * | 1/2000 | Baker | B01D 53/229 585/802 |
| 6,128,919 A | 10/2000 | Daus et al. | |
| 6,228,145 B1 | 5/2001 | Falk-Pedersen et al. | |
| 6,898,936 B1 | 5/2005 | Ochs et al. | |
| 6,932,858 B2 * | 8/2005 | Nicol | B01D 3/14 95/269 |
| 7,413,595 B2 | 8/2008 | Schmidt et al. | |
| 7,637,984 B2 | 12/2009 | Adamopoulos | |
| 7,785,397 B2 | 8/2010 | Kumar et al. | |
| 7,815,892 B2 | 10/2010 | Hershkowitz et al. | |
| 7,833,328 B2 | 11/2010 | Lackner et al. | |
| 7,909,911 B2 | 3/2011 | Lackner et al. | |
| 7,947,240 B2 | 5/2011 | Vandor | |
| 8,007,570 B2 | 8/2011 | Sonwane et al. | |
| 8,163,066 B2 | 4/2012 | Eisenberger | |
| 8,171,718 B2 | 5/2012 | Gulen et al. | |
| 8,202,349 B2 | 6/2012 | Molaison | |
| 8,282,899 B2 | 10/2012 | Bahr et al. | |
| 8,328,911 B2 | 12/2012 | Liu et al. | |
| 8,408,006 B2 | 4/2013 | Li et al. | |
| 8,414,689 B2 | 4/2013 | Tirio | |
| 8,414,853 B2 | 4/2013 | Liu et al. | |
| 8,500,855 B2 | 8/2013 | Eisenberger | |
| 8,591,627 B2 | 11/2013 | Jain | |
| 8,715,393 B2 | 5/2014 | Wright et al. | |
| 2003/0141223 A1 * | 7/2003 | Wagner | B01D 53/1425 208/312 |
| 2003/0154857 A1 | 8/2003 | Murdoch | |
| 2006/0260189 A1 | 11/2006 | Reddy et al. | |
| 2006/0281960 A1 * | 12/2006 | Jolimaitre | B01D 53/229 585/818 |
| 2008/0011161 A1 * | 1/2008 | Finkenrath | B01D 53/1475 96/4 |
| 2009/0232861 A1 | 9/2009 | Wright et al. | |
| 2010/0205968 A1 | 8/2010 | Graeber et al. | |
| 2010/0242811 A1 | 9/2010 | Court et al. | |
| 2010/0284892 A1 | 11/2010 | Grover et al. | |
| 2011/0079144 A1 | 4/2011 | Wright et al. | |
| 2011/0203311 A1 | 8/2011 | Wright et al. | |
| 2011/0239700 A1 * | 10/2011 | Hasse | B01D 53/229 95/51 |
| 2011/0268618 A1 | 11/2011 | Finkenrath | |
| 2011/0290110 A1 * | 12/2011 | Zhou | B01D 53/1475 95/45 |
| 2011/0290111 A1 * | 12/2011 | Dunne | B01D 53/1443 95/51 |
| 2012/0000175 A1 | 1/2012 | Wormser | |
| 2012/0111192 A1 * | 5/2012 | Nazarko | B01D 53/1475 95/51 |
| 2012/0216547 A1 | 8/2012 | Li et al. | |
| 2012/0227372 A1 | 9/2012 | Li et al. | |
| 2012/0312020 A1 | 12/2012 | Hume et al. | |
| 2013/0014484 A1 | 1/2013 | Caprile et al. | |
| 2013/0048561 A1 | 2/2013 | Wilson et al. | |
| 2013/0153400 A1 | 6/2013 | Hume et al. | |
| 2013/0174566 A1 | 7/2013 | Birley et al. | |
| 2013/0239804 A1 * | 9/2013 | Wynn | B01D 53/229 96/4 |
| 2013/0244305 A1 | 9/2013 | Versteeg et al. | |
| 2013/0259781 A1 | 10/2013 | Vitse et al. | |
| 2013/0305925 A1 | 11/2013 | Polak | |
| 2013/0312606 A1 | 11/2013 | Eisenberger | |
| 2013/0333568 A1 | 12/2013 | Bockman et al. | |
| 2013/0343981 A1 | 12/2013 | Wright et al. | |
| 2014/0144321 A1 * | 5/2014 | Sawamura | B01D 53/22 96/4 |
| 2014/0357925 A1 * | 12/2014 | Mitariten | B01D 53/229 585/802 |

\* cited by examiner

HYBRID PROCESS USING A MEMBRANE TO ENRICH FLUE GAS $CO_2$ WITH A SOLVENT-BASED POST-COMBUSTION $CO_2$ CAPTURE SYSTEM

This utility patent application claims the benefit of priority in U.S. Provisional Patent Application Ser. No. 61/924,373 filed on Jan. 7, 2014, the entirety of the disclosure of which is incorporated herein by reference.

TECHNICAL FIELD

The present disclosure relates to removal of $CO_2$ from post-combustion gases. In particular, the disclosure relates to a hybrid process for $CO_2$ removal including membrane-based pre-concentration of $CO_2$ in flue gas, followed by passage through a two-stage stripping unit for solvent regeneration. The described process finds utility in post-combustion carbon dioxide ($CO_2$) capture, such as from utility flue gases in coal-fired power plants and natural gas-fired power plant.

BACKGROUND OF THE INVENTION

In a typical coal-fired power plant, coal is burned in a boiler to make high temperature and pressure steam to drive a steam turbine and electricity generator. For the steam-side process, the initial superheated steam drives the high-pressure turbine first for power generation, before returning to the boiler for reheating to bring steam temperature back to over 540° C. (according to the steam cycle specifications and boiler design). The reheated steam then enters intermediate-pressure and low-pressure turbines to generate additional electricity. The steam pipe connecting the intermediate-pressure turbine exhaust and the low-pressure turbine inlet is called the cross-over section, where the steam for solvent regeneration in the $CO_2$ capture process is extracted. The exiting saturated steam from the low-pressure turbine is condensed in a water-to-steam heat exchanger (or condenser). The condensate is pressurized via feedwater pumps, heated via feedwater heaters and economizers, and fed back to the boiler to complete the steam cycle.

For the gas-side process, typically after combustion of the coal in low NOx burners the combustion gases leave the boiler and are treated by a NOx removal technology called Selective Catalytic Reduction (SCR). After the SCR treatment, the gas is further treated in a fly ash removal device, such as an electrostatic precipitator, to remove particulates. After this treatment, the gas is routed through an $SO_2$ removal device ($SO_2$ scrubber or polisher). At this point, the carbon capture process begins.

It is well-known in the art to use $CO_2$ absorbers/scrubbers including scrubbing solvents for capturing $CO_2$ from post-combustion gases, such as from utility flue gases. As an example, a conventional solvent often used is 30 weight percent monoethanolamine (MEA). Likewise, it is known to use solvents comprising piperazine, $K_2CO_3/KHCO_3$, $NH_3$, and others. In commercial use, the solvents must be regenerated, i.e. have absorbed $CO_2$ removed, for continued use in the systems. All of these processes incur costs in the form of at least energy costs and capital costs for equipment to accomplish them. An industry goal is to provide processes and systems for carbon capture and recovery, such as in commercial scale power plants, with as minimal an energy and capital cost as possible, to provide power at as low a cost as possible.

To address the aforementioned and other issues, and to meet the U.S. Department of Energy's goals of 90% $CO_2$ capture with 95% $CO_2$ purity at a cost of no more than $40/tonne of $CO_2$ captured, a hybrid process is described to achieve high percent $CO_2$ capture from low driving force coal post-combustion flue gas, $CO_2$ purity for compression, and low process energy requirement. The described process incorporates membrane-based $CO_2$ enrichment of post-combustion gases, coupled with a heat-integrated aqueous $CO_2$ capture system and a two-stage solvent regeneration process to provide a desired $CO_2$ purity from utility flue gases.

SUMMARY OF THE INVENTION

In accordance with the purposes and advantages of the present invention as described herein, in one aspect of the present disclosure a process for removal and recovery of $CO_2$ from a post-combustion gas such as a boiler or a gas turbine exhaust flue gas is described. The process includes steps of pre-concentrating a $CO_2$ component of the boiler exhaust gas by passing the flue gas through a $CO_2$-selective membrane module to provide a $CO_2$-enriched post-combustion gas and a $CO_2$-lean stream gas. Next, in a $CO_2$ absorber, the $CO_2$-enriched post-combustion gas is fed to a $CO_2$ absorber bottom and contacted with a scrubbing solvent to absorb $CO_2$ and provide a carbon-rich scrubbing solvent. The $CO_2$-lean stream is fed to the $CO_2$ absorber at an intermediate height to achieve 90% overall $CO_2$ removal. Then, absorbed $CO_2$ is stripped from the carbon-rich scrubbing solvent by a two-stage $CO_2$ stripping system. The process may further include evaporating at least a portion of a water as carrier vapor for permeate stream before the step of pre-concentrating the post-combustion gas $CO_2$ component. In embodiments, a $CO_2$-rich permeate stream is passed from the $CO_2$-selective membrane module to a bottom portion of the $CO_2$ absorber, and a $CO_2$-lean reject stream is crossed from the $CO_2$-selective membrane module to the $CO_2$ absorber at an appropriate point above the $CO_2$-rich permeate stream feed point of the $CO_2$ absorber. The $CO_2$-membrane module may be a high flux, low pressure drop, low $CO_2$ selectivity membrane.

The two stage stripping system includes a primary $CO_2$ stripping column for stripping $CO_2$ from the carbon-rich scrubbing solvent exiting the $CO_2$ absorber and a secondary $CO_2$ stripping column for stripping $CO_2$ from a carbon-lean scrubbing solvent exiting the primary $CO_2$ stripping column. In an embodiment, the secondary $CO_2$ stripping column is an ambient pressure air-swept, packed column secondary $CO_2$ stripping column. The process may include a step of passing a $CO_2$-enriched air source exiting the secondary $CO_2$ stripping column to a preheater and therefrom for use as a boiler combustion air for a pulverized coal boiler of a pulverized coal plant.

In an embodiment, the $CO_2$ absorber includes a bottom packing portion with a first cross-sectional dimension, and a top packing portion with a second cross-sectional dimension that is different from the first cross-sectional dimension. One or more intercoolers may be disposed on the absorber. The location of the intercooler(s) may be between the bottom packing portion and the top packing portion and/or at an individual section. In another embodiment, the first cross-sectional dimension is approximately ⅓ that of the second cross-sectional dimension.

In another aspect, a $CO_2$ capture and recovery system for recovery of $CO_2$ from a post-combustion gas is described, including systems and devices for accomplishing the process as described above. Incorporation of the described $CO_2$ capture and recovery system into a pulverized coal-fired power plant is described.

In the following description there are shown and described several different embodiments, simply by way of illustration of some of the modes best suited to carry out the invention. As it will be realized, the described subject matter is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated herein and forming a part of the specification, illustrate several aspects of the present invention and together with the description serve to explain certain principles of the invention. In the drawings.

Reference will now be made in detail to the present preferred embodiment of the invention, examples of which are illustrated in the accompanying drawings.

DETAILED DESCRIPTION OF THE INVENTION

Figure 1:
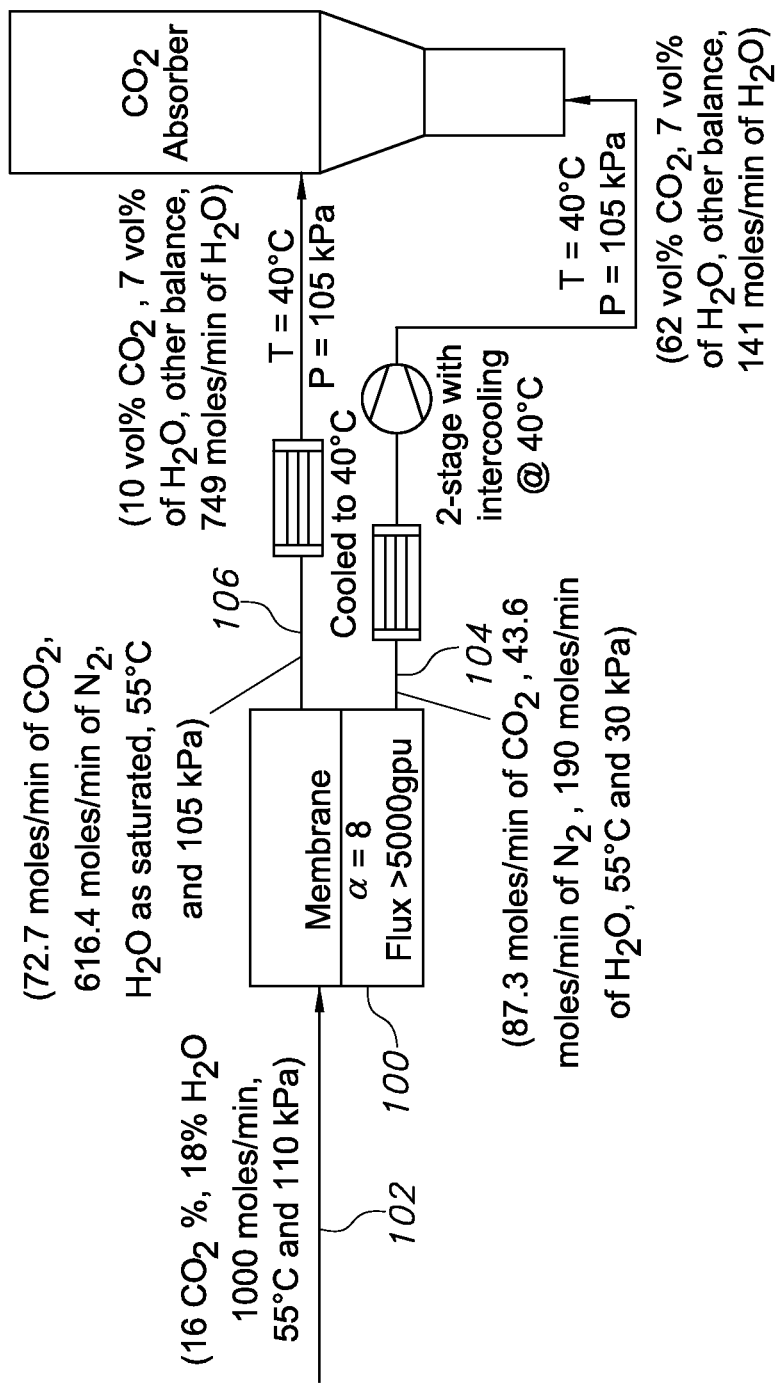
FIG. 1 schematically shows a $CO_2$-selective membrane module according to the present disclosure.

To solve the foregoing problems, at a high level the present disclosure is directed to a process for capturing $CO_2$ from low driving force post-combustion flue gases including an initial step of $CO_2$ enrichment and a subsequent heat integrated aqueous $CO_2$ capture system utilizing a solvent to upgrade the $CO_2$ purity. With reference to FIG. 1, a high flux, low pressure drop and low selectivity membrane 100 is used to split the flue gas 102 exiting an $SO_2$ polisher (not shown) into two streams. Such membranes are known in the art. The first stream is a $CO_2$-enriched permeate stream 104 comprising approximately 14% of the total flue gas, and containing approximately 60% $CO_2$ after removal of water vapor at 40° C. The second stream is a $CO_2$-lean reject stream 106 (approximately 76% of the total flue gas flow rate) containing approximately 10% $CO_2$ after water vapor removal at 40° C. $CO_2$ permeability through the membrane 100 is enhanced by providing low-quality energy available from a $CO_2$ stripper overhead condenser and/or from $CO_2$ compression intercoolers, to produce water vapor diluting the membrane permeate stream to reduce the $CO_2$ partial pressure and maintain a reasonable driving force at relatively low pressure vacuum conditions.

Figure 2:
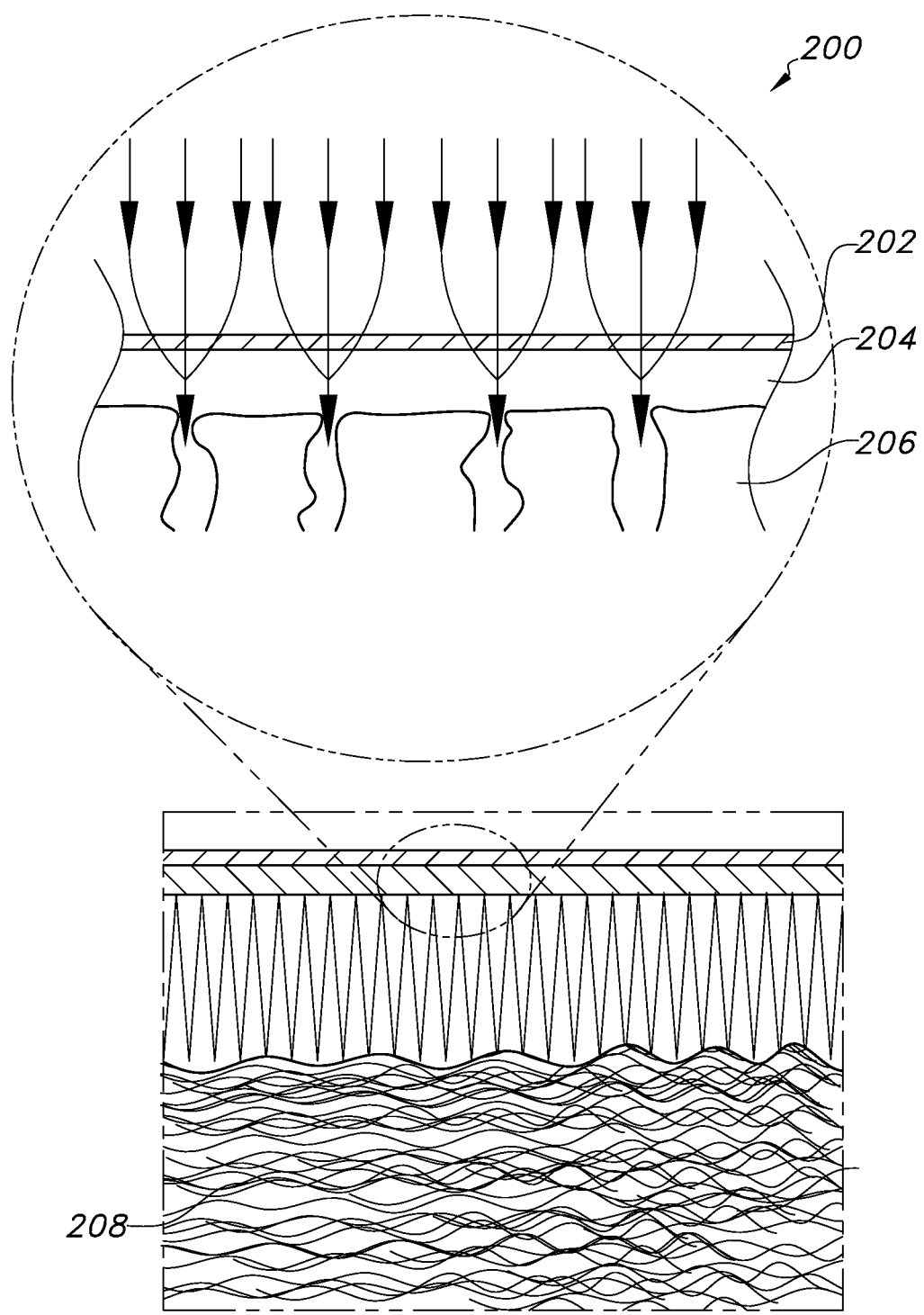
FIG. 2 shows an exemplary membrane for use in the module of FIG. 1.
Figure 3:
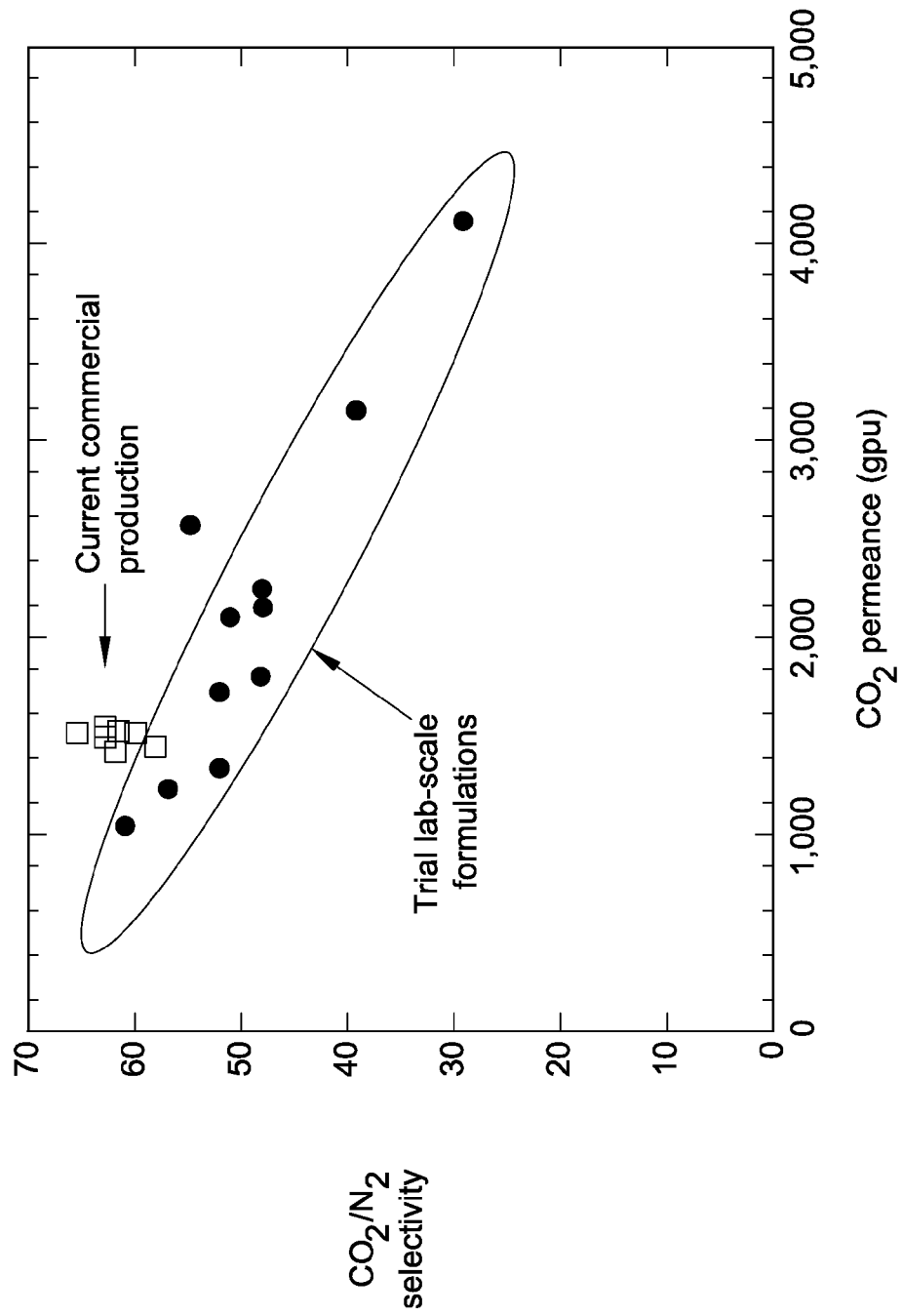
FIG. 3 graphically depicts $CO_2/N_2$ selectivity of the membrane of FIG. 2.

In one embodiment (see FIG. 2), a modified membrane 200 developed by MTR was used. This membrane comprised a $CO_2$-selective layer 202, a gutter layer 204, a porous support membrane 206, and a non-woven paper support 208. As shown in FIG. 3, such membranes exhibit decreasing selectivity as permeance increases. In laboratory trials evaluating pure $CO_2$ and $N_2$ at ambient temperature, the highest permeance sample had a $CO_2$ permeance of 4100 gpu and a $CO_2/N_2$ selectivity of 29.

As briefly described above, an effective method for removing $CO_2$ from post-combustion gases is use of a scrubbing solvent to absorb acidic $CO_2$. Exemplary solvents for use in this process include primary, secondary, and tertiary amines, although many others are known including piperazine and the stripper disclosed in the present assignee's own U.S. Published Patent Appl. No. 2012/0082604 to Liu et al. for Contaminant-tolerant Solvent and Stripping Chemical and Process for Using Same for Carbon Capture from Combustion Gases, the entirety of the disclosure of which is incorporated herein by reference. Commonly, following removal of $CO_2$ from post-combustion gases, the solvent is regenerated for re-use by removing $CO_2$ therefrom by means of a single stage stripper.

Figure 4:
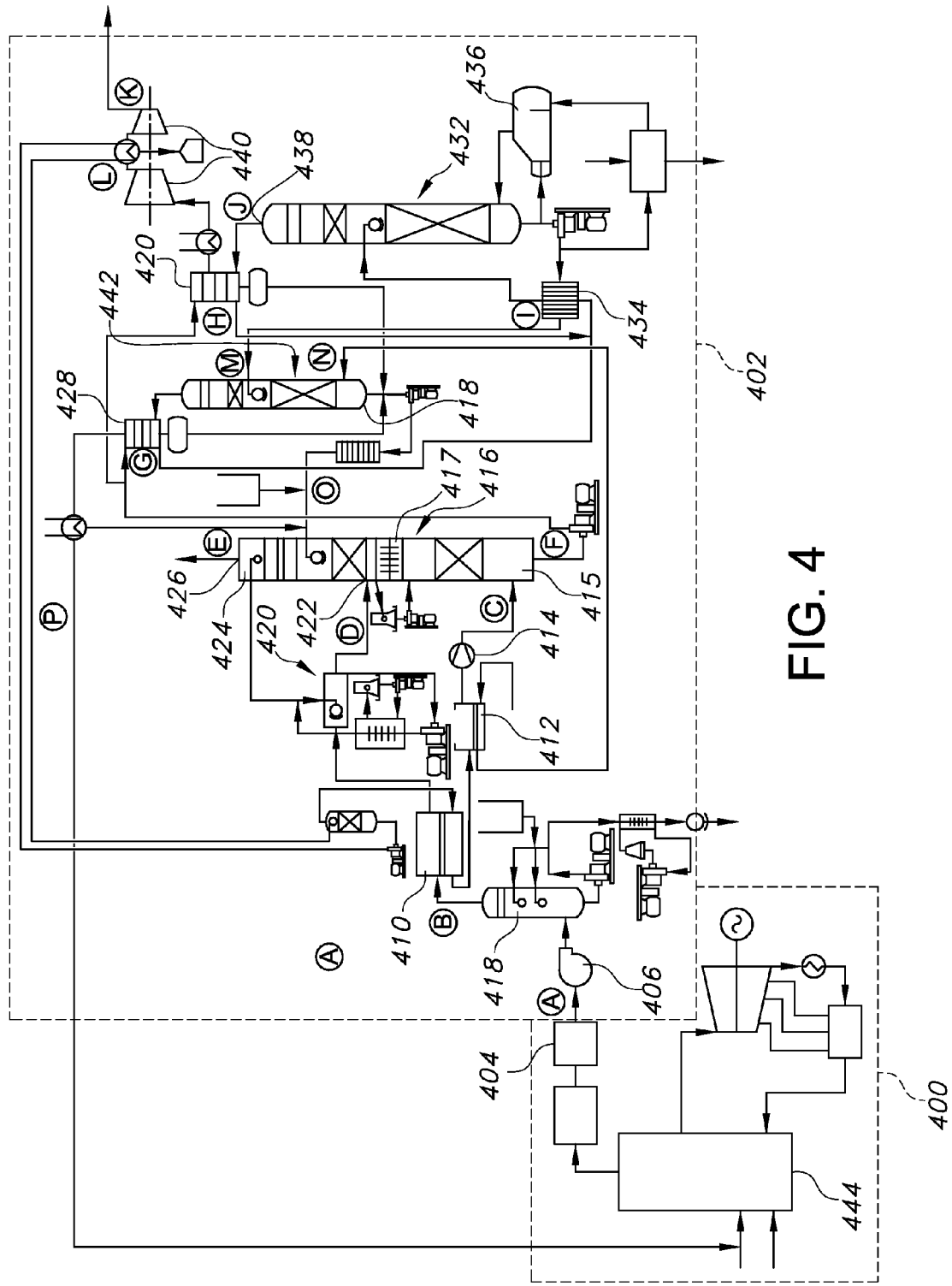
FIG. 4 schematically depicts integration of a $CO_2$ stripping and recovery system according to the present disclosure into a pulverized coal-fired power plant.

In a next aspect of the present disclosure, a two-stage stripping unit for solvent regeneration was provided. As will be described in greater detail, the unit includes an added air-based second stage stripper, inserted between a conventional rich-lean crossover heat exchanger and a lean solution temperature polishing heat exchanger. Advantageously, the outlet stream from the air-based second stage stripper, containing a low concentration of $CO_2$, is used as combustion air for a pulverized coal-fired boiler (see description of FIG. 4 below), enriching the flue gas with $CO_2$ (with approximately 0.7% de-rating of boiler efficiency).

In an embodiment (see FIG. 4), the described $CO_2$-enriching membrane and two-stage stripping unit are integrated into an existing power plant 400. The $CO_2$ capture and compression system of the present disclosure are generally referenced as block 402. Summarizing, the $CO_2$ capture and compression system 402 includes at least a pre-treatment tower, a membrane module (see FIG. 1) coupled with a water evaporator, a moisture separator, a vacuum pump, a packed column $CO_2$ absorber, two packed bed $CO_2$ strippers with one reboiler and reclaimer, and various heat exchangers, pumps, filtration devices, and a multistage compressor with intercoolers.

In more detail, after passage of post-combustion gas through an $SO_2$ polisher 404, flue gas enters a booster fan 406 to overcome downstream pressure drop. At this point (A) the flue gas is saturated with water at a temperature of around 55° C., water content of 17 vol. %, and $CO_2$ concentration of approximately 15.8 vol. % of the total wet gas stream. The flue gas then enters a counter-flow pretreatment tower 408 which uses a dilute caustic solution for further $SO_2$ and other contaminant removal. Tower 408 polishes the flue gas to <5 ppm $SO_2$, which minimizes solvent degradation and potential membrane fouling. The spent solution is cooled, crystallizing a portion of the sulfur product that is then removed via filtration.

The $SO_2$-polished flue gas then enters (see point B) a $CO_2$ membrane pre-concentration module 410 (in the depicted embodiment having a selectivity of approximately 8 and a permeance of ≥5000 gpu) to produce two streams as described above.

In pilot testing, the effect of pre-concentration of $CO_2$ by a membrane as described was evaluated. Specifically, a pre-concentration membrane provided by MTR was evaluated (see Table 1), using a stripper operated at 45 psi to eliminate any effect of discrepancy of thermal compression from various carbon loadings obtained at the $CO_2$ absorber. Various liquid/gas ratios were tested to ensure a capture efficiency of approximately 80% or greater. As indicated with similar carbon/nitrogen ratios in a lean solution returning to the $CO_2$ absorber by varying heat flux at a bottom of the $CO_2$ stripper, supplying a high $CO_2$ inlet concentration to the $CO_2$ absorber reduced energy consumption required for solvent regeneration. The energy needed for regeneration with a pre-concentration membrane was found to be approximately 30% less than that obtained from 14 vol. % $CO_2$ inlet concentration without the membrane installed.

TABLE 1

Summary of Carbon Loadings and Energy of Regeneration for Various Experiments.

| Expt | Feed $CO_2$ (%) | Perm. $CO_2$ (%) | Residue $CO_2$ (%) | L/G (wt/wt) | Stripper bottom. temp. (° C.) | % Capture | Energy Btu/lb $CO_2$ |
|---|---|---|---|---|---|---|---|
| M4 | 14 | — | 9 | 2.9 | 136 | 80 | 1007 |
| M5 | 14 | 25 | — | 3.0 | 136 | 79 | 956 |
| M6 | 14 | 29 | — | 3.2 | 136 | 81 | 1074 |
| R1 | 14 | — | — | 4.8 | 133 | 79 | 1468 |
| R2 | 14 | — | — | 5.0 | 132 | 75 | 1445 |

Using the total pressure ($P_{tot}$) in the stripper of 45 psi (310 kPa) and the partial pressure of steam ($P_{H2O}$) at the stripper exhaust temperature, the partial pressure of $CO_2$ ($P_{CO2}$) was estimated as ($P_{tot}$)=($P_{H2O}$)+($P_{CO2}$). As shown in Table 2, a reduction of steam requirement was observed by inclusion of the pre-concentration membrane.

TABLE 2

Partial Pressure of $H_2O$ and $CO_2$ at Stripper Exhaust.

| Expt | Stripper Exhaust Temp. (° C.) | Steam Partial Pressure ($P_{H2O}$) kPa | $CO_2$ Partial Pressure ($P_{CO2}$) kPa | $P_{CO2}/P_{H2O}$ |
|---|---|---|---|---|
| With membrane | 105 | 121 | 189 | 1.56 |
| Without | 107 | 130 | 180 | 1.38 |

In the depicted embodiment the membrane module 410 is operated at 55° C., and at slightly above ambient pressure at the reject side, and at a vacuum of 30 kPa at the permeate side. The permeate passes through a moisture separator or condenser 412, a compressor 414, and then enters a bottom 415 of a $CO_2$ absorber 416 (see point C). At this point, the permeate stream consists of approximately 60 vol. % $CO_2$, 31 vol. % $N_2+O_2+Ar$, trace $SO_2$ and halogens, and the balance of water vapor. In the depicted embodiment, moisture separator 412 is a membrane separator of known design. In such embodiments, a portion of the combustion air is used as a carrying gas at the permeate side of moisture separator 412. The moisture-rich air is then fed to a secondary air-based $CO_2$ stripper 418 (see point N) for $CO_2$ stripping as described below.

The reject stream proceeds through a direct water contactor 420 (in the depicted embodiment being a water spray system with liquid collection at a bottom thereof) and enters the $CO_2$ absorber 416 at an intermediate portion 422 (see point D). This is unlike conventional $CO_2$ absorber configurations including only one feed point for flue gases. The reject stream includes 10 vol. % $CO_2$ prior to entering the $CO_2$ absorber 416.

In an embodiment, the cross-sectional dimension of the bottom packing of $CO_2$ absorber 416 is approximately ⅓ of the cross-sectional dimension of the top packing, to balance the gas-side pressure drop and mass transfer requirements. An intermediate heat exchanger (cooler) 417 is interposed between the top and bottom portions of $CO_2$ absorber 416. $CO_2$-depleted flue gas is treated in a water-wash section 424 disposed at a top of the $CO_2$ absorber, using water from the direct water contactor 420 to remove residual solvent. At an exhaust point 426 of $CO_2$ absorber 416 (see point E), the flue gas is saturated with water at approximately 42° C.

After gaseous $CO_2$ is transferred to the liquid phase, the carbon-rich solution exits the $CO_2$ absorber (see point F), is pressurized, and is sent to a heat recovery unit 428 (see point G) and then to an overhead condenser 430 of a primary $CO_2$ stripper 432 (see point H). Then, the carbon rich solution proceeds to a lean/rich heat exchanger 434 (see point I). Then, the solution proceeds to the primary $CO_2$ stripper 432, which is a conventional stripper of known design. This portion of the process requires external energy to drive a steam reboiler 436. At an exit point 438 of the primary stripper 432 (see point J), the gas stream consists primarily of $CO_2$ (60 vol. %) and water vapor (40 vol. %) at a pressure of approximately 3.7 bar and a temperature of approximately 110° C.

After exiting the heat recovery unit 420, the $CO_2$ enriched gas stream is pressurized to approximately 153 bar with intercooling for downstream utilization or sequestration (see point K). Sensible heat rejected from intercoolers 440 (see point L) is used for water evaporation to increase $CO_2$ permeance driving force through $CO_2$ membrane pre-concentration module 410 as described above.

Carbon-lean solution exiting the primary stripper 432 is sent to a lean/rich heat exchanger 434 (see point I) where the heat is recovered with the carbon-rich solution. Next, the carbon-lean stream (temperature approximately 90° C.) is sent to a top (see point M) of an ambient pressure air-swept, packed column secondary $CO_2$ stripper 442 to further reduce the carbon load. An air-swept secondary $CO_2$ stripper 442 was selected due to the discovery that this system improved $CO_2$ stripping from solvent compared to conventional systems at like operating temperatures. As shown in Table 3, under laboratory conditions, at the same column operating temperature the $CO_2$ concentration in the evolved stream from the air-based stripper increased with increased solvent solution carbon loading compared to conventional systems. Likewise, at a same solvent carbon loading, high operating temperatures provided a high stream $CO_2$ concentration.

TABLE 3

Impact of Stripping Conditions on Carbon Release (30 wt % MEA solvent).

| Temperature (° C.) | Carbon Loading (mol C/kg soln.) | % $CO_2$ in evolved gas |
|---|---|---|
| 80 | 1.90 | 2.43 |
|  | 2.00 | 2.59 |
| 90 | 1.80 | 3.55 |
|  | 1.86 | 4.35 |
|  | 1.90 | 5.06 |
|  | 1.93 | 5.08 |
| 95 | 1.89 | 5.92 |
|  | 1.95 | 6.40 |

Finally, the carbon-lean stream was cooled to approximately 40° C. by power plant cooling water, and recycled to the $CO_2$ absorber 416 (see point O). Water-saturated air used as carrying gas for $CO_2$ stripping is obtained from the membrane moisture separator 412 described above. The $CO_2$ enriched air exiting the secondary $CO_2$ stripper 442 (approximately 2-4% $CO_2$ content) is fed to an air preheater and sent to the pulverized coal boiler 444 of the pulverized coal plant 400 as boiler combustion air.

Advantageously, the processes and systems of the present disclosure provide significant advantages over conventional $CO_2$ recovery technology. According to the Gibbs free energy equations (Gibbs-Helmholtz equation and Clausius-Clapeyron relation), the $CO_2$ partial pressure at a top of a $CO_2$ stripper can be expressed as:

$$P_{CO_2} = P^*_{CO_2,scrub} \times e^{\left[\frac{\Delta h_{abs,CO_2}}{R} \times \left(\frac{1}{T_{ref}} - \frac{1}{T}\right)\right]}$$

where $P^*_{CO_2,scrub}$ is the $CO_2$ equilibrium pressure in the carbon rich solution with a carbon loading at the bottom of a $CO_2$ absorber with a temperature of $T_{ref}$. For a given solvent and a temperature, $P^*_{CO_2,scrub}$ directly corresponds to the carbon loading (Carbon/Nitrogen, C/N ratio) resulting from the mass transfer M inside the $CO_2$ absorber and guided by the equation of $M=K_G$ (overall mass transfer coefficient)·A (active surface area)·$\Delta P_{CO2}$ (driving force defined by differential $CO_2$ pressure between gas and liquid phase). With an increased $CO_2$ driving force, a higher C/N ratio is achieved at a bottom of the $CO_2$ absorber, resulting in a high $CO_2$ partial pressure at a top of the $CO_2$ stripper at a desired temperature. This reduces the energy required to regenerate the same amount of $CO_2$ from a stripping solvent.

As shown in Table 4, compared to conventional equipment and a benchmark solvent (30 wt % monoethanolamine), the presently disclosed processes and systems provide a significant advantage over conventional configurations including $CO_2$ absorbers with a single feeding point. At an identical flue gas temperature (40° C.) and lean solution temperature (40° C.) fed into the $CO_2$ scrubber and a constant flue gas flowrate, the presently described technology from process simulation provided an 8% increase in carbon loading, a 19% reduction in liquid recirculation, and a 15% reduction in energy consumption while maintaining a same carbon loading of the lean solution and a 90% overall $CO_2$ capture efficiency.

TABLE 4

Comparison of $CO_2$ absorber with a single flue gas feed point to a $CO_2$ absorber with two flue gas feed points.

|  | Single flue gas feed point (normalized to unity) | Dual flue gas feed point |
| --- | --- | --- |
| Carbon loading | 1 | 1.08 |
| Solvent recirculation | 1 | 0.81 |
| Energy for regeneration | 1 | 0.85 |

In turn, the heat integration processes and systems described above provide significant advantages in reduction of energy requirements for recovery of $CO_2$ compared to conventional systems. In particular, the use of an air-based secondary stripper 442 as described above is advantageous. The extra lean solvent produced from solvent regeneration by the presently described process (compared to conventional systems using a single $CO_2$ stripper for solvent regeneration) allow use of smaller $CO_2$ absorbers and $CO_2$ strippers, reducing capital costs. Further reduction of carbon loading in the lean solvent provides a higher free amine concentration (higher pH) and lower liquid $CO_2$ partial pressure at a top of the $CO_2$ absorber. The recycling of $CO_2$ from the secondary stripper (as combustion air for a pulverized coal boiler, see description above) yields a higher $CO_2$ concentration (15-20%) compared to conventional systems. Lower liquid $CO_2$ partial pressure and higher gas phase $CO_2$ concentration increases the driving force for $CO_2$ diffusion through a liquid/gas reaction film, resulting in a higher mass transfer coefficient. Still more, reaction kinetics are enhanced by the higher free amine concentration in the upper part of the $CO_2$ absorber.

Still more, steam increases water vapor concentration in the permeate-side of $CO_2$-selective membrane module 410 that is generated by heat rejection from compressor intercoolers. This dilutes the permeance to reduce the vacuum requirement for achieving a reasonable driving force between feed and permeate sides of the $CO_2$-selective membrane, allowing reducing membrane surface area (and associated cost) for a given permeance flux. Moreover, the steam saturates (wets) the portion of combustion air in module 412 used for the secondary $CO_2$ stripper 442, reducing energy demand for water evaporation (temperature increase from bottom to top along the secondary $CO_2$ stripper). In turn, selection of low selectivity/ambient pressure operation membranes for use in the $CO_2$-selective membrane module 410 allows selection of cost-effective materials for the membrane.

Still yet more, as described above a $CO_2$ absorber 416 with staged cross-sectional areas is provided, including an intermediate cooler 417. Unlike conventional absorbers, the $CO_2$ absorber of the present disclosure includes a bottom packing having a smaller cross-sectional dimension than that of the top packing. This configuration takes advantage of a low flue gas flow rate (14% of total flue gas) while maintaining a reasonable flue gas velocity to minimize gas-side mass transfer resistance and to reduce a flooding tendency caused by a high liquid/gas ratio. In one embodiment, the present $CO_2$ absorber bottom portion cross-sectional dimension is approximately ⅓ that of the top portion cross-sectional dimension. By use of the described $CO_2$ absorber including staged cross-sectional areas of this ratio, the liquid/gas ratio is increased 7.7 times in the bottom section of packing to enhance gas-liquid contact and reshape the vapor-liquid-equilibrium operating curve in an interior of the $CO_2$ absorber, providing maximum benefit from high inlet $CO_2$ concentration ($CO_2$ gas pressure).

Figure 5:
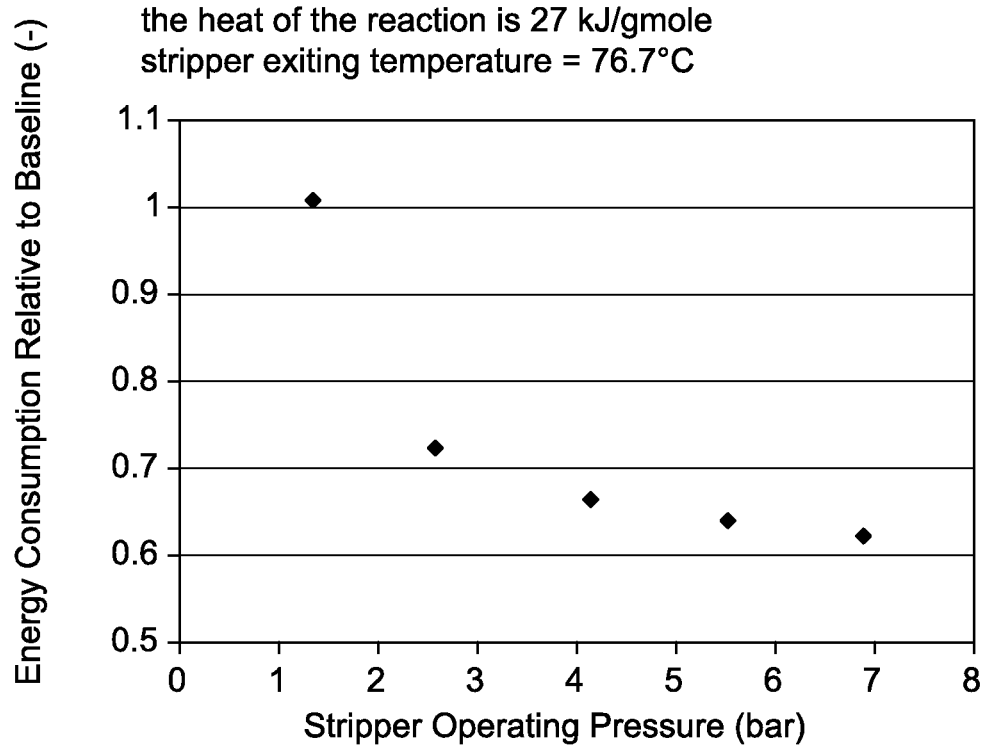
FIG. 5 graphically depicts impact of $CO_2$ stripper operating parameters on energy consumption for solvent regeneration.

In another feature, the primary $CO_2$ stripper 432 is operated at an elevated pressure (approximately 3.7 bar), reducing energy consumption for $CO_2$ compression by 30% compared to conventional systems. As shown in FIG. 5, energy consumption is significantly reduced as stripper operating pressure increases. As the stripper pressure increases, the mole ratio of $CO_2/H_2O$ (vapor) at the stripper outlet is increased at a given temperature, leading to overall reduction in energy consumption. The operating pressure (3.7 bar) was found to maximize the energy benefit while minimizing capital investments and solvent degradation (solvent degradation is known to increase with increasing temperature, but energy savings for solvent regeneration by increasing stripper operating pressure reach a point of diminishing returns).

Numerous other advantages accrue from the presently described processes and systems. Combining membrane pre-concentration of flue gas $CO_2$ and use of a two-stage stripping system as described provided a $CO_2$ mass-transfer flux of energy on average 2.5 times faster than that of conventional systems, with further benefits deriving from the $CO_2$ absorber including staged cross-sectional dimensions as described. The high mass-transfer flux resulted in the ability to provide a smaller $CO_2$ absorber to capture the same amount of $CO_2$ from a flue gas stream. $CO_2$ absorber size reductions of up to 50% compared to conventional absorbers are anticipated compared to conventional systems/solvents.

Further, the described heat integration processes are anticipated to reduce plant cooling tower heat rejection duty (the amount of heat processes by the cooling tower) by 12-19%, reducing capital cost for the cooling tower and auxiliary equipment by approximately 15%.

The foregoing description has been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled. In turn, the drawings and preferred embodiments do not and are not intended to limit the ordinary meaning of the claims in their fair and broad interpretation in any way when interpreted in accordance with the breadth to which they are fairly, legally and equitably entitled.

What is claimed:

1. A process for removal and recovery of $CO_2$ from a post-combustion flue gas, comprising:
   pre-concentrating a $CO_2$ component of the post-combustion flue gas by passing the post-combustion flue gas through a $CO_2$-selective membrane module to provide a $CO_2$-enriched permeate stream and a $CO_2$-lean reject stream;
   in a $CO_2$ absorber, contacting the $CO_2$-enriched permeate stream and the $CO_2$-lean reject stream with a scrubbing solvent to absorb $CO_2$ and provide a carbon-rich scrubbing solvent; and
   stripping absorbed $CO_2$ from the carbon-rich scrubbing solvent by a two-stage $CO_2$ stripping system.

2. The process of claim 1, further including evaporating at least a portion of a water component of a post-combustion flue gas condensate for use as a carrier vapor for a permeate side of the $CO_2$-selective membrane module.

3. The process of claim 1, further including passing a $CO_2$-rich permeate stream from the $CO_2$-selective membrane module to a feed point disposed at a bottom portion of the $CO_2$ absorber and passing the $CO_2$-lean reject stream from the $CO_2$-selective membrane module to an intermediate feed point above the $CO_2$ absorber bottom portion feed point.

4. The process of claim 1, further including providing a $CO_2$-membrane module comprising a high flux, low pressure drop, low $CO_2$ selectivity membrane.

5. The process of claim 1, further including providing a two stage stripping system comprising:
   a primary $CO_2$ stripping column for stripping $CO_2$ from the carbon-rich scrubbing solvent exiting the $CO_2$ absorber; and
   a secondary $CO_2$ stripping column for stripping $CO_2$ from a carbon-lean scrubbing solvent exiting the primary $CO_2$ stripping column.

6. The process of claim 5, including providing an ambient pressure air-swept, packed column secondary $CO_2$ stripping column.

7. The process of claim 1, including providing a $CO_2$ absorber having a bottom packing portion with a first cross-sectional dimension, and a top packing portion with a second cross-sectional dimension that is different from the first cross-sectional dimension.

8. The process of claim 1, including providing one or more intercoolers at intermediate positions of the $CO_2$ absorber.

9. The process of claim 7, wherein the first cross-sectional dimension is approximately ⅓ that of the second cross-sectional dimension.

10. The process of claim 6, including passing a $CO_2$-enriched air source exiting the secondary $CO_2$ stripping column to a preheater and therefrom as a boiler combustion air for a pulverized coal boiler of a pulverized coal plant.

11. A $CO_2$ capture and recovery system for recovery of $CO_2$ from a post-combustion gas, comprising:
   a $CO_2$-selective membrane module for pre-concentrating a $CO_2$ component of an $SO_2$-depleted post-combustion gas to provide a $CO_2$-enriched permeate stream and a $CO_2$-lean reject stream;
   a $CO_2$ absorber for providing a carbon-rich scrubbing solvent by contacting the $CO_2$-enriched permeate stream and the $CO_2$-lean reject stream with a scrubbing solvent to absorb $CO_2$; and
   a two-stage $CO_2$ stripping system for stripping absorbed $CO_2$ from the carbon-rich scrubbing solvent.

12. The system of claim 11, further including a moisture separator or condenser for removing at least a portion of a water vapor component of the $CO_2$-enriched permeate stream.

13. The system of claim 11, wherein the $CO_2$-enriched permeate stream from the $CO_2$-selective membrane module is passed to a feed point disposed at a bottom of the $CO_2$ absorber and the $CO_2$-lean reject stream from the $CO_2$-selective membrane module is passed to an intermediate feed point above the $CO_2$-absorber bottom feed point.

14. The system of claim 11, wherein the $CO_2$-membrane module comprises a high flux, low pressure drop, low $CO_2$-selectivity membrane.

15. The system of claim 11, wherein the two stage stripping system comprises:
   a primary $CO_2$ stripping column for stripping $CO_2$ from the carbon-rich scrubbing solvent exiting the $CO_2$ absorber; and
   a secondary $CO_2$ stripping column for stripping $CO_2$ from a carbon-lean scrubbing solvent exiting the primary $CO_2$ stripping column.

16. The system of claim 15, wherein the secondary $CO_2$ stripping column is an ambient pressure air-swept, packed column $CO_2$ stripping column.

17. The system of claim 15, wherein the $CO_2$ absorber includes a bottom packing portion with a first cross-sectional dimension and a top packing portion with a second cross-sectional dimension that is different from the first cross-sectional dimension.

18. The system of claim 11, wherein the $CO_2$ absorber further includes one or more intercoolers disposed at intermediate positions of the $CO_2$ absorber.

19. The system of claim 17, wherein the first cross-sectional dimension is approximately ⅓ that of the second cross-sectional dimension.

20. The system of claim 16, wherein a $CO_2$-enriched air source exiting the secondary $CO_2$ stripping column is passed to a preheater and therefrom to a pulverized coal boiler of a pulverized coal power plant as a boiler combustion air.

21. A pulverized coal-fired power plant comprising the $CO_2$ capture and recovery system of claim 11.

* * * * *